3,208,518
DELAYED VISCOUS WATERFLOODING
John T. Patton, Tulsa, Okla., assignor to Jersey Production Research Company, a corporation of Delaware
Filed July 31, 1961, Ser. No. 128,005
11 Claims. (Cl. 166—9)

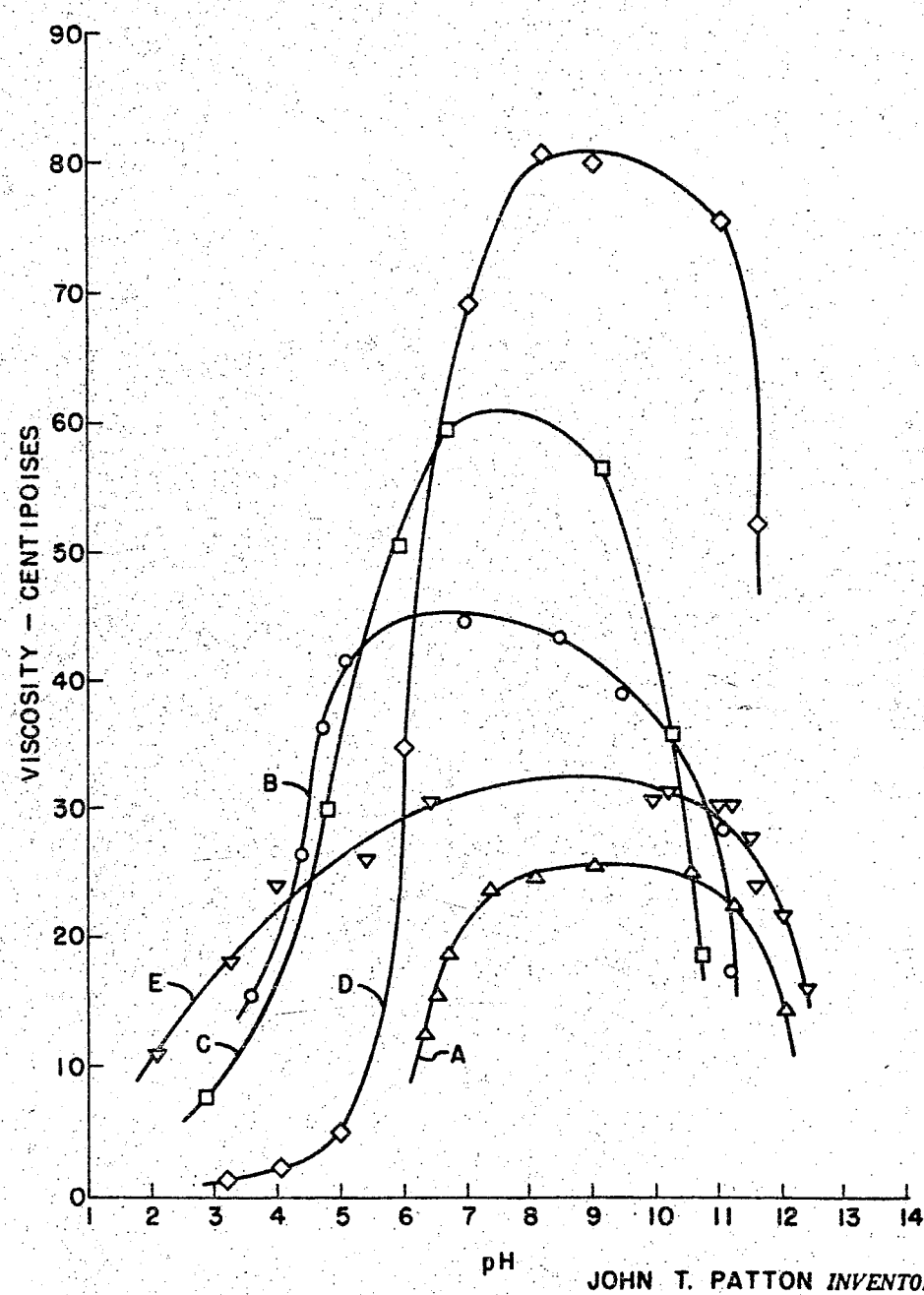

The present invention relates to waterflooding processes useful for the recovery of crude oil from subsurface reservoirs and more particularly relates to a delayed viscous waterflooding process wherein an ionic polymer solution of low viscosity is injected into an oil bearing reservoir under controlled conditions such that an increase in viscosity will take place as the solution displaces crude oil contained in the reservoir.

Viscous waterflooding is among the more promising processes developed for the recovery of crude oil from subsurface oil-bearing reservoirs in recent years. Laboratory work and field tests have shown that the injection of water or brine containing a thickening agent in a concentration sufficient to give a viscosity approaching that of crude oil will generally permit the displacement of substantially more oil from a reservoir than could be obtained by waterflooding the reservoir in the usual manner. One difficulty frequently encountered in viscous waterflooding operations, however, is that of low injectivity. The rate at which a fluid can be forced into a porous medium varies inversely with viscosity and hence an increase in floodwater viscosity to obtain greater oil recovery is accompanied by a decrease in the rate at which the solution can be injected into the reservoir under a given pressure gradient. This either necessitates a corresponding increase in the time allotted for completion of the waterflooding operation or else requires that injection pressures in excess of those normally used in waterflooding operations be employed. Neither alternative is attractive from an economics standpoint. Longer recovery periods tie up invested capital which might be made available for other projects, result in greater expense for the operation and maintenance of equipment, and reduce overall return on investment. The use of higher injection pressures requires larger pumps than might otherwise be used, frequently necessitates the installation of heavier well bore casing and other new equipment in existing wells, and may pose problems due to inadvertent fracturing of the formation. Efforts to avoid these difficulties have been largely unsuccessful in the past and hence viscous waterflooding processes have yet to be widely used in the petroleum industry.

It is therefore an object of the present invention to provide an improved waterflooding process which will permit an increase in floodwater viscosity without an equivalent reduction in injectivity. A further object is to provide an improved viscous waterflooding process wherein a substantial reduction in injectivity due to the high flow resistance in the immediate vicinity of the injection well is avoided by introducing a solution of low viscosity into the reservoir under conditions such that a delayed increase in viscosity will take place after the solution has progressed some distance into the reservoir from the injection well. Other objects will become apparent as the process of the invention is described in greater detail hereafter.

In accordance with the invention, it has now been found that injectivity difficulties encountered with viscous waterflooding processes utilized in the past can largely be avoided by employing solutions of high molecular weight ionic polymers under controlled pH conditions. Studies have shown that aqueous solutions containing water-soluble polymers of the ionic type undergo characteristic changes in viscosity with changes in hydrogen ion concentration. Such solutions normally have low viscosities at low pH values, reach maximum viscosities at intermediate pH levels, and again exhibit low viscosities at very high pH values. By adjusting the pH of a polymer solution which has the desired viscosity under conditions existing in the reservoir to be waterflooded, a reduction in viscosity sufficient to permit injection of the solution into the reservoir at a reasonable rate without the use of high injection pressures can readily be obtained. As the solution so injected progresses into the reservoir from the injection well, the hydrogen ion concentration in the solution will change until a value equivalent to that of the connate water in the reservoir is reached. The viscosity of the solution will increase simultaneously until the desired viscosity has been attained. Since injection rate is determined primarily by the rate of flow through the formation in the immediate vicinity of the injection well, the delayed increase in viscosity which thus takes place in the process of the invention permits the high oil recovery normally associated with viscous waterflooding without an equivalent reduction in flood water injectivity.

The figure of the drawing illustrates the effect of pH on viscosity of various aqueous polymer solutions.

A variety of water-soluble polymers of the ionic type may be utilized as thickening agents in carrying out the process of the invention. Such polymers characteristically have long spiral molecules. At intermediate pH values the molecules are loosely coiled and retard movement of the molecules of the solvent in which the polymer is dissolved. This accounts for the viscosity of such solutions. At pH values outside this intermediate range, the polymer molecules coil more tightly and hence the viscosity of the solution is reduced. Since this phenomenon is reversible, the viscosities of aqueous solutions containing such polymers can be varied at will over wide ranges by merely changing the hydrogen ion concentrations.

The polymers utilized for purposes of the invention may be of either the natural or synthetic type. Suitable synthetic polymers having ionic structures includes homopolymers prepared from acyclic unsaturated carboxylic acids such as acrylic acid and substituted acrylic acids; copolymers of unsaturated carboxylic acids such as acrylic acid and methacrylic acid with low molecular weight olefins such as propylene and isobutylene; copolymers of unsaturated monocarboxylic acids such as acrylic acid and methacrylic acid with unsaturated dibasic acids and acid anhydrides such as fumaric acid, maleic acid and maleic anhydride; copolymers of unsaturated dibasic acids and acid anhydrides such as maleic acid and maleic anhydride with vinyl aromatic compounds such as styrene, vinyl toluene, vinyl naphthalene, p-chlorostyrene, dichlorostyrene, trans-stilbene, isoallylbenzene, vinyl carbazol and vinyl ferrocene; copolymes of unsaturated dibasic acids and acid anhydrides such as maleic acid and maleic anhydride with unsaturated salts, esters and ethers of mono and dicarboxylic acids such as methyl methacrylate, ethyl acrylate, allyl propionate, ethyl fumarate, isopropyl maleate, vinylmethyl ether, vinyl acetate, vinyl chloride and acrylonitrile; copolymers of unsaturated monocarboxylic acids such as acrylic and methacrylic acids with vinyl aromatics such as styrene and vinyl toluene; sulfonated polyvinyl aromatics such as sulfonated polystyrene, sulfonated polyvinyl toluene and sulfonated copolymers of styrene and vinyl toluene; and the like. Methods for the polymerization of organic monomers to produce these and similar water-soluble synthetic polymers of the ionic type suitable for purposes of the invention have been described at length in the chemical and patent literature and will therefore be familiar to those skilled in the art. Also useful for purposes of the invention are ionic type water-soluble polymers derived from natural sources. These include ionic polysaccharides such as alginic acid and sodium alignate which are found in plants and in gums and resins obtained as plant exudates, certain polysaccharides produced by the fermentation of sugars, starches and other carbohydrates by bacteria of the genus Xanthomonas and similar organisms, and ionic polysaccharides produced extracellularly by the yeasts Cryptococcus, Laurentii var. Flavescens NRRL-Y-1401 and the like. Other ionic water-soluble polymers will suggest themselves to those skilled in the art.

It will be recognized that the solubility properties, stability characteristics, and thickening efficiencies of water-soluble ionic polymers differ and that all such polymers are therefore not equally effective for purposes of the invention. In general the ionic polysaccharides have high thickening efficiency, are highly stable under reservoir conditions, and can be produced at lower cost than can the synthetic polymers. The use of these materials, particularly those produced by *Xanthomonas campestris, Xanthomonas begonia, Xanthomonas phaseoli, Xanthomonas hederae, Xanthomonas incanae, Xanthomonas carotae, Xanthomonas translucens* and related organisms, is therefore preferred for purposes of the invention.

The ionic water-soluble polymers employed as thickening agents will normally have molecular weights in the range between about 300,000 and about 5,000,000 Staudinger. The molecular weight range most effective in the case of a particular ionic polymer will depend upon the polymer structure and the solubilizing groups present on the molecule. In most cases molecular weights in excess of about 1,000,000 Staudinger are preferable.

In carrying out the process of the invention, an aqueous ionic polymer solution having sufficient viscosity under normal reservoir conditions to permit effective displacement of crude oil from the reservoir to be waterflooded is first prepared. The viscosity required in a particular operation will depend upon the viscosity of the crude oil contained in the reservoir, the reservoir permeability to oil, and the permeability with respect to water. These are interrelated by the mobility ratio, defined by the equation $$MR = \frac{V_o K_w}{V_w K_o}$$

where K designates the reservoir permeability, V represents viscosity, and the subscripts $w$ and $o$ denote water and oil respectively. A mobility ratio of unity indicates that the water and oil will move through the reservoir in the presence of one another with equal ease. At a mobility ratio greater than 1, displacement of oil by the water is relatively inefficient and hence the water tends to bypass oil contained in zones of low permeability. A mobility ratio less than 1 permits reasonably effective displacement of the oil by the injected water. Where practical, the viscosity of the aqueous solution should be sufficient to give a mobility ratio less than 1. It will be understood, however, that process efficiency can be improved by increasing the viscosity of the water even though the increase is not sufficient to produce a mobility ratio less than 1.

The ionic polymer concentration required to give the desired viscosity will depend upon the particular polymer utilized. In general, the concentration necessary depends primarily upon the molecular weight of the polymer. The synthetic polymers are normally used in concentrations between about 0.05 percent and about 2.0 percent by weight. The polysaccharides generally have higher molecular weights than the synthetic compounds and are therefore effective in concentrations between about 0.001 percent and about 1.0 percent by weight. The concentration required in the case of a particular polymer can readily be determined in the laboratory.

Following preparation of the viscous polymer solution to be utilized, the viscosity is reduced by adjusting the pH of the solution. The necessary reduction can generally be obtained by either increasing or decreasing the pH level. The method employed will depend upon the particular polymer utilized and the characteristics of the reservoir to be waterflooded. Solutions containing certain polymers undergo greater reductions in viscosity at low pH values than at correspondingly high pH levels and hence the addition of an acid or a salt of a strong acid and a weak base to depress the pH will be preferable. Suitable acids and salts include hydrochloric acid, sulfuric acid, nitric acid, acetic acid, formic acid, propionic acid, maleic acid, succinic acid, aluminum chloride, magnesium chloride, manganese sulfate, zinc nitrate and the like. In other cases the addition of a base or a salt of a weak acid and a strong base is preferable. Bases and salts which may be employed include ammonium hydroxide, sodium hydroxide, potassium hydroxide, sodium acetate, sodium carbonate, potassium tartrate and the like. The use of an alkaline reagent may be preferred in carbonate reservoirs and similar formations where an acid might be neutralized prematurely by reaction with the reservoir rock. Phosphate complexes and other materials may also be employed for adjustment of the pH of the polymer solution.

After the polymer solution has been treated to effect the desired reduction in viscosity, it may be pumped into the reservoir through one or more injection wells in the conventional manner. As the injected solution moves away from the injection well, the pH gradually changes due to the neutralization of acidic or basic constituents in the solution by materials present in the reservoir. In the case of an acidic solution for example, excess hydrogen ions may exchange with sodium in the clays present in the reservoir to effect a reduction in pH; while hydroxyl ions in a basic solution may react with hydrogen ions and other substituents from the reservoir. This neutralization, accompanied by an increase of the viscosity of the injected solution, continues until the pH of the solution reaches a value equivalent to that of the reservoir. The injected aqueous solution thus does not reach the full viscosity needed for effective displacement of the crude oil in the reservoir until it has advanced some distance from the injection well. The process of the invention is therefore referred to as a delayed viscous waterflooding process.

The delayed increase in viscosity within the reservoir does not have a significant adverse effect upon injectivity. Resistance to flow of the injected solution through the reservoir rock is highest immediately adjacent the injection well because of the relatively small reservoir cross-section through which the solution must move. The cross-sectional area rapidly increases as the solution moves outwardly from the well bore and hence the resistance to flow quickly becomes very small. At a distance 20 feet from the well bore for example, the pressure gradient required to move the fluid is only about 1/40 of that necessary to move it an incremental distance from the well bore into the formation. The effect of the delayed increase in viscosity within the reservoir on the pressure required at the injection well is therefore quite small. As a result, the process of the invention obviates the necessity for injection pressures significantly in excess of those normally employed for injection purposes and for a given pressure gradient permits more rapid injection of the floodwater than might otherwise be obtained in a viscous waterflooding operation.

Water or brine containing an ionic polymer may be injected into the reservoir in the above manner throughout the waterflooding operation. Satisfactory results can generally be obtained, however, by adding the polymer to only a portion of the water or brine injected into the reservoir. This leads to the establishment of a bank of viscous solution in the reservoir surrounding the well used for injection purposes. Ordinary water or brine containing no thickener can then be injected in order to propel the bank of viscous solution through the reservoir toward one or more production wells from which the displaced crude oil is to be recovered. The volume of thickened water used in an operation of this type should, of course, be sufficient to prevent the later injected water from breaking through the bank and contacting the reservoir in advance of the viscous solution. A diminishing concentration of polymer beginning at the leading edge of the bank and continuing to the trailing edge is generally preferable in order to avoid a premature breakthrough of the later-injected water. The required thickness of the bank used will depend upon the distance over which it is to be propelled, the nature of the porous rock in the reservoir, and the viscosity of the fluid in the bank. In an operation carried out with a single injection well and one or more production wells spaced a distance of 600 feet or more from the injection well, a bank of viscous solution about 100 to about 400 feet thick should ordinarily be established in the vicinity of the injection well to assume persistance of the bank during the entire waterflooding operation. The volume of viscous solution which must be injected to establish such a bank can readily be calculated from information as to the distance between the injection well and the most remote production well, the average thickness of the reservoir, and the average porosity of the reservoir. Such information is normally available with respect to any reservoir in which a waterflooding operation is to be carried out. As a general rule, the volume of viscous solution employed will constitute from about 1 to about 50 percent of the pore volume of the reservoir to be flooded and will preferably amount to at least 10 percent of the reservoir pore volume.

Waterflooding operations employing the polymer solutions may be carried out with regular flooding patterns. The pattern utilized need not cover the entire reservoir and hence the reservoir pore volume in connection with a particular flooding operation will normally be considered to be the volume of that portion of the reservoir underlying the lateral area defined by the flood pattern. In a large reservoir, several flood patterns may be carried out simultaneously. The quality of viscous solution employed in each pattern should be based upon the volume of the reservoir underlying that pattern. In line drive waterflooding operations for example, it is normally assumed that the pore volume of the reservoir under flood between each row of injection wells and an adjacent row of production wells is the total pore volume of the reservoir underlying the lateral area between the two rows. The quantity of water or brine containing the ionic polymer to be injected through a row of injection wells toward a row of producing wells should then be from 1 to about 50 percent of the total reservoir pore volume underlying the area between the two rows.

The ionic polymers employed as thickening agents in the proces of the invention may be utilized in conjunction with other materials conventionally used in waterflooding operations. Such materials include bactericides and preservatives, surface active agents, corrosion inhibitors, and tracers designed to permit a check upon the progress of the flooding operation. Many suitable materials which may thus be employed will be familiar to those skilled in the art. Care should of course be taken to ascertain that the materials selected do not adversely affect the ionic polymers employed in the proces or prevent control of the pH of the polymer solutions.

In a modification of the process of the invention, an acidic or basic solution may be injected into the reservoir to be waterflooded prior to the introduction of the ionic polymer solution. Neutralization of the polymer solution will generally occur in response to reaction of the acidic or basic constituents in the polymer solution with materials native to the reservoir. In certain sandstones and some other formations, however, the injection of an acid or basic solution to permit better control of the neutralization may be desirable. Such a solution will generally be followed by a slug of untreated water or brine to prevent a premature increase in the viscosity of the later injected polymer solution. A small bank of dilute acid or base is normally sufficient to obtain the delayed increase in viscosity.

The process of the invention is further illustrated by the following examples.

EXAMPLE I

A copolymer prepared by the polymerization of acrylic acid and styrene in a benzene diluent with an azo-bis-isobutyronitrile catalyst was dissolved in distilled water in a concentration of 0.2 percent by weight. The polymer utilized had a molecular weight of about 500,000 Staudinger. The pH of this solution, measured electrometrically, was found to be 6.38. Measurement of the viscosity at this pH level with a Brookfield viscometer at 6 revolutions per minute gave a value of 12.2 centipoises. The pH of the solution was then increased stepwise by the addition of dilute sodium hydroxide and the viscosity was determined at various pH levels. The results obtained are set forth in the following table and illustrated in the accompanying drawing.

Table I

EFFECT OF CHANGES IN pH ON VISCOSITY OF ACRYLIC ACID-STYRENE COPOLYMER SOLUTION

| pH | Viscosity, Centipoises | pH | Viscosity, Centipoises |
|---|---|---|---|
| 6.38 | 12.2 | 9.09 | 25.3 |
| 6.52 | 15.5 | 10.60 | 25.0 |
| 6.72 | 18.7 | 11.30 | 22.5 |
| 7.40 | 23.8 | 12.05 | 14.2 |
| 8.11 | 24.8 | | |

It can be seen from the data in Table I above and from curve A in the drawing that the solution containing the acrylic acid-styrene copolymer increased in viscosity at pH values between about 6 and about 9 and decreased in viscosity as the pH level was changed from about 9 to about 12. This behavior is typical of ionic water-soluble polymers. By injecting an acrylic acid-styrene copolymer solution having a pH below about 6 or above about 12 into a reservoir having a normal pH between about 7 and about 11, an increase in viscosity from 14 centipoises or lower up to about 25 centipoises can be obtained without the disadvantages which would normally accompany the injection of a 25 centipoise solution into the reservoir. Since the concentration of the polymer in the solution determines the viscosity at a particular pH level, the initial and final viscosities can readily be controlled by use of the polymer in the proper concentration.

EXAMPLE II

A copolymer of vinylmethyl ether and maleic anhydride produced by the low temperature reaction of the monomers in the presence of an azo-bis-isobutyronitrile catalyst was added to distilled water in a concentration of 0.5 percent by weight. The viscosity of this solution was measured with the Brookfield viscometer at pH values between 3.6 and 11.2. The results are shown in Table II below.

Table II

EFFECT OF CHANGES IN pH ON VISCOSITY OF VINYLMETHYL ETHER-MALEIC ANHYDRIDE COPOLYMER SOLUTION

| pH | Viscosity, Centipoises | pH | Viscosity, Centipoises |
|---|---|---|---|
| 3.6 | 15.4 | 8.5 | 43.5 |
| 4.4 | 26.6 | 9.5 | 39.1 |
| 4.7 | 36.5 | 11.1 | 28.6 |
| 5.1 | 41.9 | 11.2 | 17.5 |
| 7.0 | 44.9 | | |

The data in Table II and curve B in the drawing further demonstrate the effect of changes in pH upon the viscosity of aqueous solutions containing ionic polymers. It will be noted that the vinylmethyl ether-maleic anhydride copolymer solution had a relatively low viscosity at pH values of 3.6 and 11.2 but had a viscosity of nearly 45 centipoises at the neutral point. The injection of such a solution at a pH less than about 3.6 or greater than about 11.2 into a reservoir having a normal pH of about 7 would permit a significant delayed increase in viscosity as the pH of the solution approached that of the reservoir. Again the initial and final viscosity values could be increased or decreased by changing the polymer concentration.

EXAMPLE III

A high molecular weight polyacrylic acid was dissolved in distilled water and tested in the manner described above. The effect of changes in pH upon the viscosity of the solution is shown by the data in Table III below and by curve C in the drawing.

*Table III*

EFFECT OF CHANGES IN pH ON VISCOSITY OF POLY-ACRYLIC ACID SOLUTION

| pH | Viscosity, Centipoises | pH | Viscosity, Centipoises |
|---|---|---|---|
| 2.89 | 7.9 | 6.71 | 59.5 |
| 4.39 | 22.7 | 9.20 | 56.4 |
| 4.81 | 29.9 | 10.39 | 36.0 |
| 5.21 | 41.2 | 10.75 | 18.9 |
| 5.96 | 50.6 | | |

Again it will be noted that the polymer solution exhibited a high viscosity over a broad intermediate range in pH values and had much lower viscosities outside that range. This typical behavior of dilute aqueous solutions thickened with ionic polymers permits the use of such polymers to obtain a delayed increase in viscosity during viscous waterflooding operations.

EXAMPLE IV

A commercial water-soluble ionic polymer of the methacrylic type marketed as a thickener for aqueous media was added to distilled water in a concentration of 0.2 percent by weight. The viscosity of this solution was then determined at several pH levels in the manner described earlier. The results obtained are shown in Table IV and by curve D in the drawing.

*Table IV*

EFFECT OF CHANGES IN pH ON VISCOSITY OF METH-ACRYLIC POLYMER SOLUTION

| pH | Viscosity, Centipoises | pH | Viscosity, Centipoises |
|---|---|---|---|
| 3.21 | 1.5 | 8.24 | 81.2 |
| 4.04 | 2.2 | 9.01 | 80.6 |
| 5.0 | 5.0 | 11.02 | 76.0 |
| 6.01 | 35.2 | 11.61 | 52.5 |
| 7.03 | 69.5 | | |

The data in Table IV above show that the viscosity of the solution underwent a change from about 1.5 centipoises to about 81 centipoises as the pH was increased from about 3 to about 8 by the addition of sodium hydroxide. This change in viscosity permits the injection of a polymer solution into a subsurface reservoir to form a highly viscous bank of solution without the injectivity problems which would otherwise be encountered.

EXAMPLE V

A water-soluble ionic polysaccharide was produced by inoculating a sterlie solution containing about 2.0 weight percent of raw sugar, about 0.1 weight percent of dipotassium acid phosphate and about 0.05 weight percent of a commercial bacteria nutrient with *Xanthomonas campestris* and fermenting this solution under aerobic conditions at a temperature of about 75° F. The fermentate obtained after about 72 hours was filtered to remove the bacterial cells and was then diluted with distilled water to produce an aqueous solution containing about 0.075 weight percent of the polysaccharide. This solution had an initial pH of 6.20 and a viscosity of 30.6 centipoises. Dilute hydrochloric acid was added to the solution stepwise until a pH of 2.10 had been attained. Viscosity measurements were made with the Brookfield viscometer as the pH decreased. The pH of the solution was then raised to a final value of 12.4 by the addition of dilute sodium hydroxide and viscosity measurements were again made at various pH values. It was found that the viscosity reached a maximum of about 31.4 centipoises at a pH of about 10.2 and then declined to about 16.0 centipoises at the 12.4 pH level. These results are summarized in the following table and illustrated by curve E in the drawing.

*Table V*

EFFECT OF CHANGES IN pH ON VISCOSITY OF SOLUTION CONTAINING POLYSACCHARIDE PRODUCED BY *XANTHOMONAS CAMPESTRIS*

| pH | Viscosity, Centipoises | pH | Viscosity, Centipoises |
|---|---|---|---|
| 2.10 | 11.0 | 11.0 | 30.4 |
| 3.25 | 18.0 | 11.2 | 30.4 |
| 5.40 | 26.0 | 11.5 | 28.0 |
| 6.20 | 30.6 | 11.6 | 24.0 |
| 9.95 | 30.8 | 11.8 | 22.0 |
| 10.2 | 31.4 | 12.4 | 16.0 |

The results set forth in Table V and depicted by curve E in the drawing demonstrate that the effect of pH on the viscosity of aqueous solutions containing water-soluble ionic polymers is not limited to solutions prepared with synthetic polymers. A variety of polysaccharides and similar polymers derived from natural sources exhibit pH-viscosity relationships similar to those of the synthetic polymers and can therefore be utilized for purposes of the invention.

EXAMPLE VI

The process of the invention can be better understood by considering a delayed viscous waterflooding operation designed to recover crude oil from a sandstone reservoir containing about 3 percent clay. The reservoir has a relative permeability to water about 0.2 times the relative permeability to crude oil and is therefore classified as a slightly water-wet reservoir. The absolute permeability is about 300 millidarcies and the porosity is about 24 percent. Oil saturation at the onset of the waterflooding operation is about 45 percent; while the water saturation is about 30 percent. The viscosity of the oil in place is about 20 centipoises. About 1200 acres of the reservoir are to be waterflooded. The average sand thickness is about 30 feet. The reservoir thus contains about 30 million barrels of oil in place.

Calculation of the floodwater viscosity required to achieve a favorable mobility ratio in the reservoir under consideration shows that a viscosity of 4.0 centipoises will give a mobility ratio of 1 and that a favorable ratio less than 1 can be obtained by utilizing a solution having a viscosity in excess of 4.0 centipoises. An ionic polysaccharide produced by fermenting sugar beet juice with *Xanthomonas campestris* organisms is to be utilized as the thickening agent in the waterflooding operation. Laboratory tests have shown that this polymer will produce a viscosity of about 6 centipoises at the reservoir pH of about 8 when present in dilute aqueous solution in a concentration of about 0.02 percent by weight.

In carrying out the waterflooding operation, a viscous polysaccharide solution is first prepared in batches by adding the polysaccharide to brine obtained from producing wells in an adjacent field. The solution is acidified by the addition of concentrated hydrochloric acid in a concentration sufficient to depress the pH from the initial value of about 6.5 to a final value of about 2.0. This results in a reduction in viscosity of the solution from about 5 to about 2 centipoises. The solution is then pumped into the reservoir through injection wells located in multiple five-spot patterns. Injection of the low viscosity ionic polymer solution is continued in this manner until a total of about 3 million barrels have been introduced into the reservoir. At this point a bank of the solution has been established about each of the injection wells in each of the five-spot patterns. The recovery operation is then continued by injecting ordinary brine containing no polymer into the reservoir through the injection wells.

As the injected polysaccharide solution flows into the reservoir adjacent each of the injection wells, the hydrochloric acid contained in the solution reacts with carbonates and other alkaline materials in the clays with which it comes into contact. The pH of the solution gradually approaches that of the connate water in the reservoir. As the pH increases, a corresponding increase in the viscosity of the injected solution takes place. At the reservoir pH of about 8, the solution has a viscosity of about 6 centipoises. The bank of viscous solution thus established is moved outwardly from the vicinity of the injection wells by the later injected brine. The viscous bank promotes more effective displacement of the crude oil and reduces preferential flow of the brine through high permeability zones in the reservoir. Crude oil displaced by the solution flows into the production wells and is pumped to the surface in the conventional manner. The operation is carried out until the oil-to-water ratio becomes so low that further injection of brine is uneconomical. Much more total oil is recovered from the reservoir than could have been obtained in a conventional waterflooding process carried out in the absence of a thickening agent. The delayed increase in viscosity made possible by the use of an ionic polymer under controlled pH conditions significantly improves the economics of the process by permitting higher injection rates than could otherwise have been obtained at the injection pressure utilized.

EXAMPLE VII

In a secondary recovery operation for the displacement of a 14 centipoise oil from a reservoir having a pH of about 7, a solution of a sulfonated copolymer of styrene and vinyl toluene is employed. The sulfonated polymer is produced by the emulsion polymerization of a mixture of equal volumes of toluene and styrene in the presence of an azo-bis-isobutyrontitrile catalyst and the subsequent sulfonation of the product with complexed sulfur trioxide prepared by adding $SO_3$ to triethyl phosphate in dichloroethane. This polymer is added to the brine in a concentration of 0.3 percent by weight to produce an aqueous solution having a viscosity of 14.8 centipoises at a pH of 6.8. Hydrochloric acid is added to the polymer solution until the pH is decreased to a value of about 2.1. The relationship between pH and viscosity for this particular polymer over the pH range between about 2.1 and 9.1 is shown in the following table, the values for which were obtained by titrating a 0.3 weight percent solution with hydrochloric acid and periodically determining pH and viscosity values in the manner described in Examples 1 through 5.

Table VI

EFFECT OF CHANGES IN pH ON VISCOSITY OF SULFONATED COPOLYMER SOLUTION

| pH | Viscosity, Centipoises | pH | Viscosity, Centipoises |
|---|---|---|---|
| 2.1 | 2.3 | 3.9 | 13.7 |
| 2.4 | 3.8 | 6.8 | 14.8 |
| 3.0 | 11.8 | 9.1 | 15.0 |
| 3.4 | 12.5 | | |

The reservoir to be flooded with the polymer solution is pretreated by injecting a 1 percent solution of sodium hydroxide into the reservoir through each of the injection wells. The quantity of NaOH injected at each well is determined by calculating the amount required to reduce the pH of the later-injected polymer solution to the desired level by reacting with acidic constituents in the solution. Following this introduction of sodium hydroxide solution into the reservoir, brine is injected at each well to prevent premature reaction of acidic constituents in the polymer solution. The solution containing the sulfonated copolymer of styrene and vinyl toluene is then injected into the reservoir through each of the injection wells under a pressure of about 500 pounds per square inch, only slightly in excess of the injection pressure which would normally be used in a conventional waterflooding operation in this reservoir. After a volume of polymer solution equivalent to about 10 percent of the reservoir pore volume has been injected, the injection of brine into the reservoir is commenced. Injection of the brine is continued until a high oil-to-oil ratio at the production wells indicates that the economic limit of the waterflooding operation has been reached.

The sodium hydroxide solution employed to pretreat the reservoir results in a high sodium hydroxide concentration on the rock surfaces with which the later-injected polymer solution comes into contact. The acidic constituents of the polymer solution are neutralized by reaction with the sodium hydroxide and hence the viscosity of the solution increases from the initial value of about 2.3 centipoises to a vicosity of about 15 centipoises. The delayed increase in viscosity thus obtained in accordance with the invention permits injection of the polymer solution into the reservoir at pressures commensurate with those employed in conventional waterflooding operations without a sacrifice in injection rate. The bank of viscous solution permits more effective displacement of crude oil toward the production wells than could be obtained in a conventional waterflooding operation carried out without a thickening agent.

It will be evident from the foregoing that the delayed viscous waterflooding process of the invention may be carried out with a wide variety of water-soluble ionic polymers and is not limited to the use of the specific polymers referred to in the preceding examples. The delayed increase in viscosity obtained with such polymers under controlled pH conditions may be utilized in a variety of operations requiring the establishment of a bank of viscous fluid within a subsurface formation.

What is claimed is:

1. A process for recovering crude oil from a subsurface oil-bearing reservoir which comprises preparing an aqueous solution of a high molecular weight ionic polymer, said solution having a viscosity at the pH of said reservoir in excess of that of water; adjusting the pH of said solution to obtain a viscosity below that of said solution at the pH of said reservoir; injecting said solution into said reservoir at the reduced viscosity through at least one injection well penetrating said reservoir; and recovering crude oil displaced by said solution through at least one production well penetrating said reservoir.

2. A process as defined by claim 1 wherein said solution is an aqueous solution of an ionic polysaccharide.

3. A process as defined by claim 1 wherein said solution is an aqueous solution of a sulfonated polyvinylaromatic.

4. A process as defined by claim 1 wherein the pH of said reservoir in the vicinity of said injection well is adjusted, prior to the injection of said polymer solution, by injecting an aqueous solution containing a compound which will react with constituents of said polymer solution to effect a change in the pH of said polymer solution.

5. A process for displacing crude oil from a subsurface oil-bearing reservoir which comprises dissolving a water-soluble ionic polysaccharide in water in a concentration between about 0.001 percent and about 1.0 percent by weight, adjusting the pH of the solution containing said polysaccharide to obtain a viscosity less than the viscosity of said solution at the pH of said reservoir, injecting said solution into said reservoir through at least one injection well penetrating said reservoir, and recovering crude oil displaced by said solution through at least one production well penetrating said reservoir.

6. A process as defined by claim 5 wherein said polysaccharide is an ionic polysaccharide produced by the action of bacteria of the genus Xanthomonas on a carbohydrate.

7. A process as defined by claim 5 wherein the pH of said polysaccharide solution is adjusted by the addition of an acid to said solution.

8. A process as defined by claim 5 wherein the pH of said reservoir in the vicinity of said injection well is adjusted, prior to the injection of said polysaccharide solution, by injecting into said reservoir through said injection well a bank of aqueous solution containing a compound which will react with constituents in said polysaccharide solution to effect a change in the pH of said polysaccharide solution.

9. A process as defined by claim 8 wherein said aqueous solution is a sodium carbonate solution.

10. In an oil recovery operation wherein a bank of viscous aqueous solution is injected into a subterranean formation surrounding an injection well to displace oil contained in said formation toward a production well, the improvement which comprises adding a high molecular weight water-soluble ionic polymer and an acid to an aqueous liquid in concentrations sufficient to produce a solution having a viscosity below that of a solution containing said polymer in the same concentration at the pH of said formation, injecting said solution containing said polymer and acid into said formation, and thereafter recovering oil displaced by said solution at said production well.

11. In an oil recovery operation where a bank of viscous aqueous solution is injected into a subterranean formation surrounding an injection well to displace oil contained in said formation toward a production well, the improvement which comprises adding a high molecular weight water-soluble ionic polymer and a base to an aqueous liquid in concentrations sufficient to produce a solution having a viscosity below that of a solution containing said polymer in the same concentration at the pH of said formation, injecting said solution containing said polymer and base into said formation, and thereafter recovering oil displaced by said solution at said production well.

References Cited by the Examiner

UNITED STATES PATENTS

| | | | |
|---|---|---|---|
| 2,612,485 | 9/52 | Baer et al. | 252—8.5 |
| 2,950,760 | 8/60 | Bernard | 166—9 |
| 3,000,790 | 9/61 | Jeanes et al. | 195—31 |
| 3,007,879 | 11/61 | Jordan | 260—209 |

OTHER REFERENCES

U.S. Dept. of Agriculture, Publ. CA–N–14, "Microbial Polysaccharides," April 1961, 3 pages.

CHARLES E. O'CONNELL, Primary Examiner.

---

UNITED STATES PATENT OFFICE
CERTIFICATE OF CORRECTION

Patent No. 3,208,518           September 28, 1965

John T. Patton

It is hereby certified that error appears in the above numbered patent requiring correction and that the said Letters Patent should read as corrected below.

In the grant, lines 1 to 3, for "assignor to Jersey Production Research Company, a corporation of Delaware" read -- assignor, by mesne assignments, to Esso Production Research Company, of Houston, Texas, a corporation of Delaware --; line 12, for "Jersey Production Research Company, its successors" read -- Esso Production Research Company, its successors --; in the heading to the printed specification, lines 3 and 4, for "assignor to Jersey Production Research Company, a corporation of Delaware" read -- assignor, by mesne assignments, to Esso Production Research Company, Houston, Tex., a corporation of Delaware --.

Signed and sealed this 7th day of March 1967.

(SEAL)
Attest:

ERNEST W. SWIDER                  EDWARD J. BRENNER